Patented Apr. 30, 1940

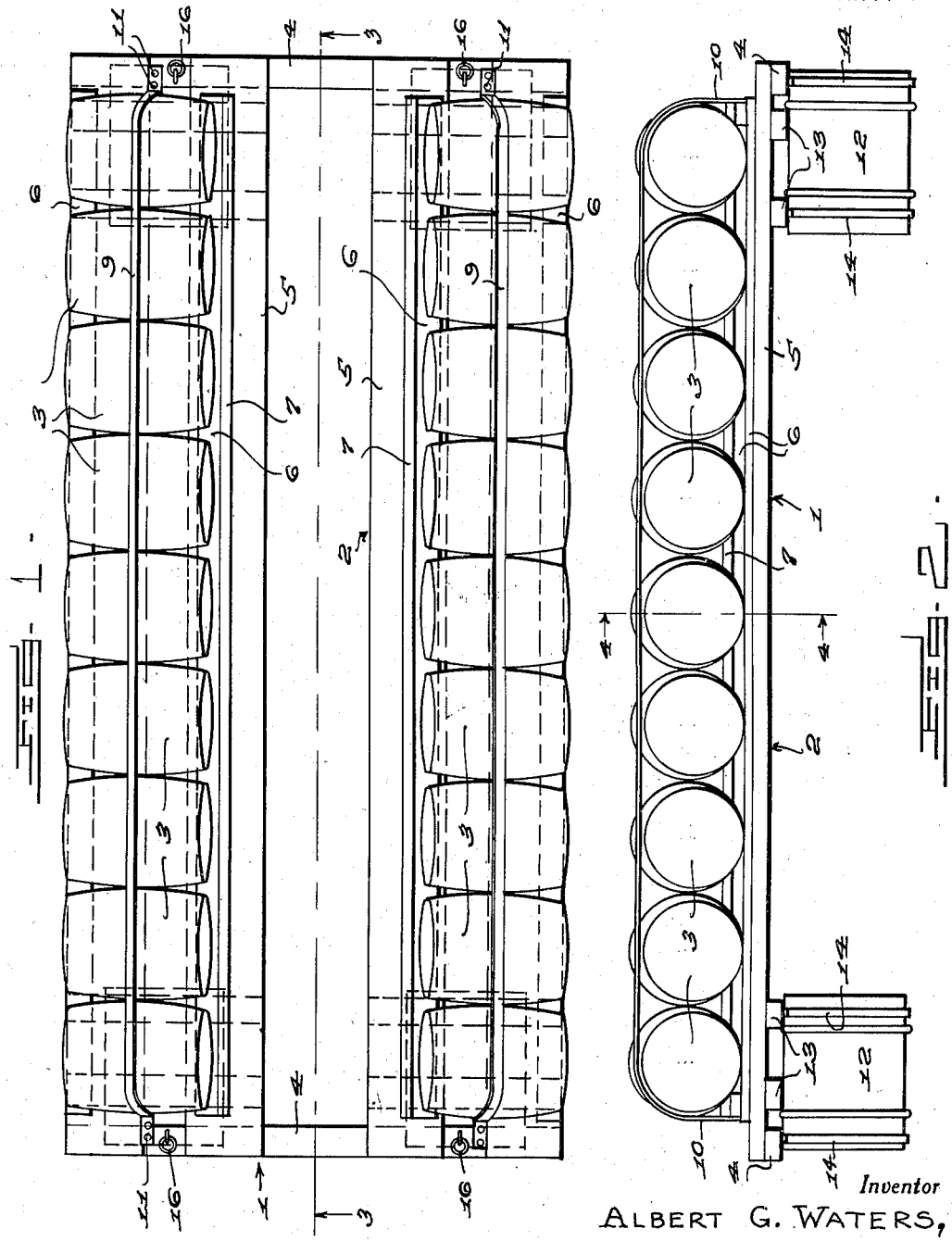

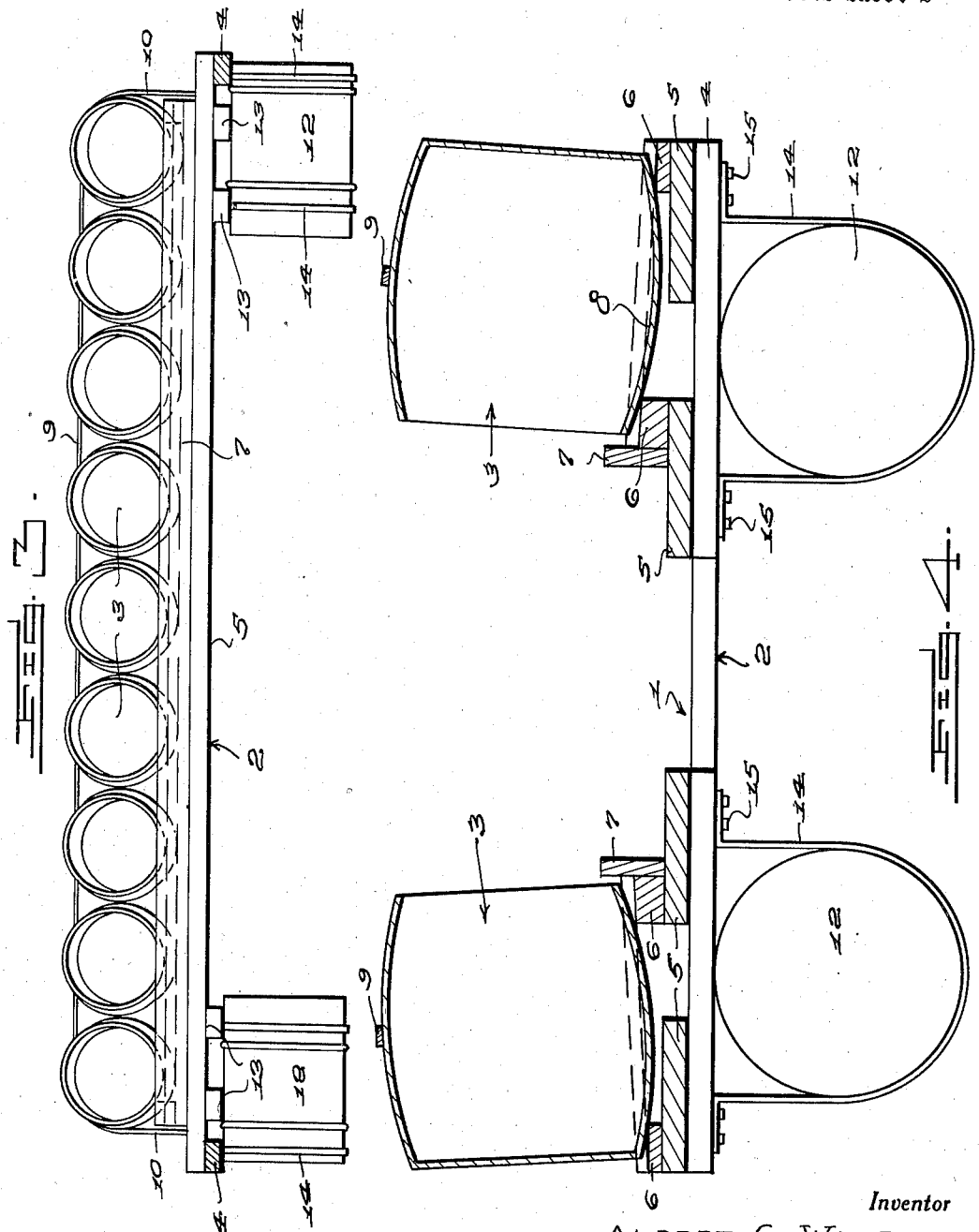

2,198,748

UNITED STATES PATENT OFFICE 2,198,748

NESTING APPARATUS

Albert G. Waters, Perth Amboy, N. J.

Application May 22, 1939, Serial No. 275,068

2 Claims. (Cl. 119—45)

My invention relates to rafts and more particularly to improvements in nesting apparatus for water fowl and the like.

The invention is designed with the particular purpose in view of providing an efficient nesting apparatus for ducks, geese and other water fowl which seek their nests along shore and whereby the nests, eggs, and young fowl will be protected from injury by tides, vermin, predatory animals, such as dogs, cats and the like, and which will also in time of storms protect the setting fowls.

Another object is to provide a device of the character and for the purpose above set forth which is durable, substantially weatherproof, and inexpensive to manufacture.

Other and subordinate objects are also comprehended by my invention, all of which together with the precise nature of my improvement will be readily understood when the succeeding description and claims are read with reference to the drawings accompanying and forming part of this specification.

In said drawings:

Figure 1 is a view in top plan of apparatus constructed in accordance with my invention.

Figure 2 is a view in side elevation.

Figure 3 is a view in longitudinal section taken on the line 3—3 of Figure 1 looking in the direction indicated by the arrows, and Figure 4 is a view in transverse section taken on the line 4—4 of Figure 2 looking in the direction indicated by the arrows and drawn to an enlarged scale.

Referring to the drawings by numerals, the apparatus of my invention, in its preferred embodiment, has the form of a raft 1 with a skeleton deck 2 and side rows of nests 3 on said deck.

The deck 2 is an elongated rectangular structure comprising a pair of transverse cleats 4 preferably of wood, at opposite ends of the structure, respectively. The cleats 4 support a pair of laterally spaced similar bars 5, preferably wooden planks, extending along each side of the structure in parallel relation with their ends secured in any suitable manner to said cleats 4. A pair of narrow, preferably wooden bars 6 extend along the tops of each pair of bars 5 adjacent the outer edges of the latter and parallel therewith, said bars 6 being suitably secured to the bars 5 and the innermost bar 6 of each pair being higher than the outermost. A pair of roost rails 7 extend along the tops of the innermost bars 5 and alongside the innermost bars 6, said rails 7 projecting slightly above the bars 5 for gripping by the fowls in roosting.

Each pair of bars 6 supports a plurality of nests 3 in the form of nail kegs disposed lengthwise across the bars 6 in a row and in side by side contacting relation with open ends innermost and closed ends outermost. As is best shown in Figure 4, the roost rails 7 extend above the bottom portions of the open ends of the nests 3 and function as guards preventing eggs and young fowl from being thrown out of the nests under pitching of the apparatus. The innermost bar 6 of each pair being highest the nests 3 are tilted endwise upwardly so that the open end of each nest is the highest, thereby further preventing eggs or young fowls from rolling out under pitching of the apparatus. As is also shown in Figure 4 the kegs forming the nests 3 are of usual convex side type forming in the described position thereof concave bottoms 8 for the nests accommodated between the bars 6.

The nests 3 of each row are secured together in the described relation and to the bars 6 by means of a yoke 9 of flexible strap iron one of which is provided for each row and which extends lengthwise of the row across the tops of the nests 3 approximately centrally thereof. Each yoke 9 comprises ends 10 bent around the end nests 3 of the row and extending down to the cleats 4 to which said ends are secured by spikes, or nails, as at 11.

The described deck is supported by corner floats 12 preferably having the form of closed metal cylinders. The floats 12 are clamped to the cleats 4 and to short cross cleats 13 secured to the under side of each pair of bars 5 alongside the cleats 4. For this purpose a pair of U-shaped strap iron yokes 14 for each float 12 is utilized, said yokes being looped around the float adjacent opposite ends thereof, respectively, and bolted, as at 15, to the adjacent cleats 4 and one of the cleats 13.

Suitable mooring rings are secured to the cleats 4, as at 16, so that the apparatus may be tied to shore stakes, or the like, or anchored as desired.

The described apparatus, as will now readily be seen, provides a safe nesting place for ducks, more particularly, in which eggs, or young, may be left protected against rain, wind, high tides, rodents, and to a large extent vermin. The apparatus may be very inexpensively constructed, is easy to keep clean and is inaccessible as regards the nests, to rats either of the land or water variety, weasels, and such animals, by virtue of the fact that the metal floats 12 block approach of such to the nests for reasons which will be understood.

The construction, use and advantages of my invention will, it is believed, be clearly understood from the foregoing without further explanation.

Manifestly the invention, as described, is susceptible of modification without departing from the inventive concept and right is herein reserved to such modifications as fall within the scope of the subjoined claims.

What I claim is:

1. A raft for nesting water fowls comprising a skeleton deck of substantially rectangular form, corner floats supporting said deck and comprising closed metal cylinders, and a row of nests surmounting said deck along each side thereof, said nests being of barrel-like form and extending in each row crosswise of the deck and side by side, the nests of each row having closed ends disposed outermost and open ends disposed innermost, and being inclined to dispose the closed ends thereof lowermost, and a pair of roost bars on said deck extending along said rows of nests, respectively, and across the open ends of said nests, said bars projecting above the bottoms of said open ends to prevent young fowls from creeping out of the nests.

2. A raft for nesting water fowls comprising a skeleton deck of substantially rectangular form, corner floats supporting said deck, and a row of nests surmounting said deck along each side thereof, said nests being of barrel-like form and extending in each row cross-wise of the deck and side by side, the nests of each row having closed ends disposed outermost and open ends disposed innermost, and being inclined to dispose the closed ends thereof lowermost, and a pair of roost bars on said deck extending along said rows of nests, respectively, and across the open ends of said nests, said bars projecting above the bottoms of said open ends to prevent young fowls from creeping out of the nests.

ALBERT G. WATERS.